April 25, 1961 D. A. KEKLIKIAN 2,981,006
PUNCH DEVICE
Filed Aug. 3, 1959
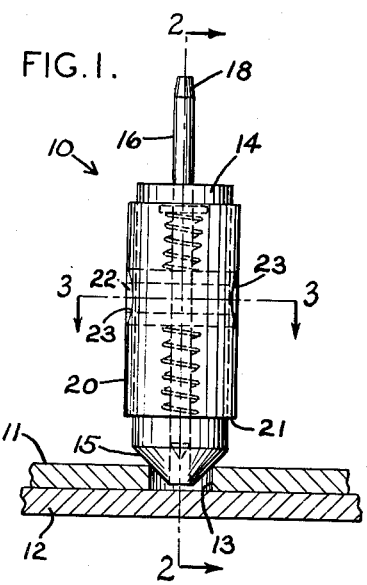
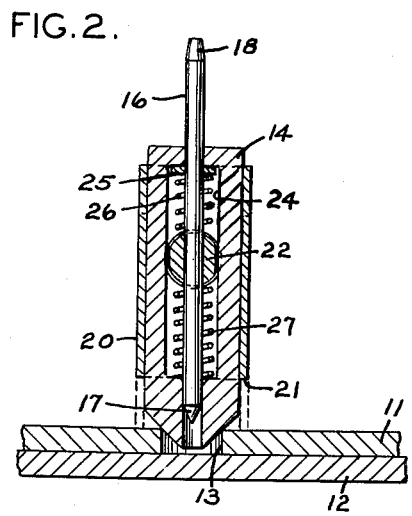
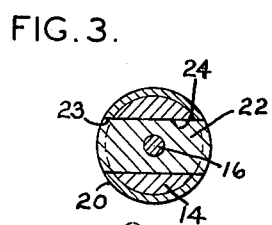
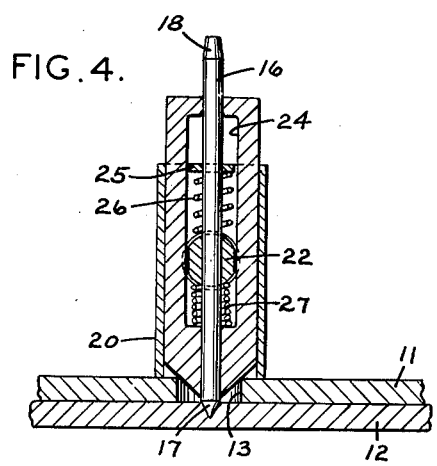
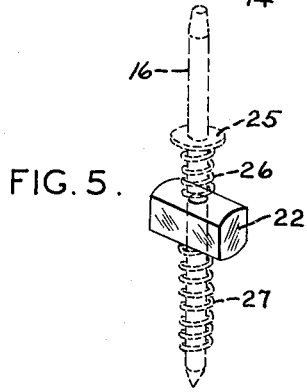
INVENTOR,
DANIEL A. KEKLIKIAN.
BY Cohn and Powell
ATTORNEYS.

United States Patent Office 2,981,006
Patented Apr. 25, 1961

2,981,006
PUNCH DEVICE
Daniel A. Keklikian, 202 Connolly Drive, Burke City, St. Louis County 35, Mo.
Filed Aug. 3, 1959, Ser. No. 831,127
3 Claims. (Cl. 33—191)

This invention relates generally to improvements in a punch device, and more particularly to improvements in a device of this type adapted to transfer the center of a manufacturing hole in one work piece to another work piece.

Heretofore in layout work when it was necessary or desirable to transfer the precise position of a circular manufacturing hole in one plate, constituting a reference plate, to another plate, constituting the work plate, the plates were first positioned with the reference plate over the work plate in proper alignment and retained in place. Then, a tool having the exact diameter of the hole was inserted and tapped to mark the plate. It is seen that this prior method required a plurality of tools of numerous different sizes in order to accommodate the many different sizes of holes to be transferred.

It is an important object of this invention to provide a single punch device that is adaptable to any size hole within predetermined limits of diameters, and thereby eliminates the need for the great number of individual tools previously required.

In the heretofore conventional method previously described, if a particular hole size fell between a pair of tool sizes kept in stock, the transfer of the hole center could not be accurately made, but only made as a matter of compromise with the use of the smaller tool. An important object achieved by the present invention is that the instant punch device is capable of accommodating any hole diameter within the predetermined range of the device regardless of the rarity of any particular size presented in manufacturing processes.

Another important object is realized by the provision of cone-aligning means carried by the punch body and adapted to engage the reference plate so as to center automatically a conical end of the body in any manufacturing hole, and of a punch rod selectively movable through the center of the conical body end so as to mark the precise center of the hole onto the work plate.

Still another important object is provided by the provision of resilient means tending to hold the punch rod in retracted position with the conical body end, yet permitting extension of one rod end through the cone for marking purposes when the opposite end is struck.

Another important object is afforded by the provision of another resilient means operatively interconnecting the cone-aligning means and the body carrying such means so that the means is normally held ahead of the conical body end and hence out of engagement with the reference plate, yet enabling the said means to be relatively movable on the body to engage the reference plate when desired so as to align and center the conical body end in the manufacturing hole.

An important object is realized by the structural arrangement and connection of the cone-aligning sleeve, punch rod and centering body which enable the sleeve and rod to be retained normally in an inoperative position, yet permit selectively each of these parts to be used independently and concurrently to perform the transference of the hole center to a work plate, and then return the parts to their initial position after operation.

Another important object is to provide a punch device of this type which is simple and durable in construction, efficient in operation, economical to manufacture, and which is capable of ready use by anyone with only a minimum of instruction.

The foregoing and numerous other objects and advantages of the invention will more clearly appear from the following detailed description of a preferred embodiment, particularly when considered in connection with the accompanying drawing in which:

Fig. 1 is a side elevational view of the hold center transfer punch positioned on a layout assembly;

Fig. 2 is a cross-sectional view of the punch as seen along line 2—2 of Fig. 1, the broken line indicating the extent of movement of the guide sleeve;

Fig. 3 is a cross-sectional view of the punch as seen along line 3—3 of Fig. 1;

Fig. 4 is a cross-sectional view of the punch device similar to that illustrated in Fig. 2, but illustrating the sleeve and punch rod moved to their operative marking positions, and Fig. 5 is a perspective view of the sliding key operatively interconnecting the sleeve and body, the broken lines illustrating the assembly of the key with cooperating spring means and punch rod.

Referring now by characters of reference to the drawing, it is seen that the hole center transfer punch, generally indicated at 10, is adapted for use with a layout assembly in which a reference plate 11 is disposed over and aligned with a work plate 12. The reference plate 11 is provided with a manufacturing hole 13 the precise center of which is desired to be marked on the work plate so that an identical manufacturing hole can be reproduced.

The punch device includes an elongate body 14 of generally cylindrical configuration. One end of body 14 is provided with a conical formation 15 adapted to interfit the manufacturing hole 13. A punch rod 16 is slidably mounted and carried by the body 14 along its longitudinal axis. One end of punch rod 16 is provided with a marking point 17 that is adapted to move through the center or apex of the conical body end to mark the work plate 12 underlying the manufacturing hole 13. The opposite end 18 of punch rod 16 extends out of the opposite end of the body 14 so that it can be struck or tapped with an appropriate tool in order to extend the pointed punch end 17 for marking purposes.

Mounted on the body 14 and slidably carried thereby is a sleeve 20 that constitutes a guide or body-centering means. The sleeve 20 is provided with an abutment 21 at one end that is normally held in a retracted position relative to the body 14 ahead of the conical body end 15, yet is selectively extensible to an extended position in which the abutment 21 engages the surface of the reference plate 11, as is best illustrated in full lines in Fig. 4.

A key 22 is carried in diametrically opposed apertures 22 formed in sleeve 20. The body 14 is provided with a longitudinal slot 24 extending laterally therethrough. The key 22 extends transversely through the body slot 24. As is best seen in Figs. 2 and 3, the key 22 is provided with opposed flat sides adapted to engage the straight margin of the body 14 defining the longitudinal slot 24. The key 22 and its cooperating body slot 24 operate to prevent relative rotation of sleeve 20 on body 14 and serve to guide the longitudinal movement of sleeve 20 along the body 14. In addition, the key 22 is provided with a central aperture through which the punch rod 16 slidably extends. It is seen that the key 22 provides a bearing for the mounting of the punch rod 16 and assists in causing movement of the rod 16 along the longitudinal axis of body 14.

Fixed to the punch rod 16 at one side of the key 22 is a grip washer 25. A spring 26 located in body 14 at one side of key 22 and disposed about the punch rod 16 normally tends to hold the punch rod 16 in its retracted position with the body 14, as is illustrated in Fig. 2. One end of spring 26 engages the grip washer 25 while the opposite end engages the key 22. When the sleeve 20 is in its retracted position as is illustrated in Fig. 2, the spring 26 tends to urge the grip washer 25 upwardly into engagement with the top wall of body 14, thereby urging the punch rod 16 upwardly to its fully retracted position.

Another spring 27 is located within the slot 24 of body 14 on the opposite side of key 22, and is disposed about the punch rod 16 similar to the mounting of spring 26. However, one end of spring 27 engages the key 22 while the opposite end engages the body 14 at the bottom of slot 24. The spring 27 normally tends to hold the sleeve 20 in a retracted position relative to the body 14, as is best seen in Fig. 2 in full lines.

It is thought that the functional advantages and operation of the hole center transfer punch has become fully apparent from the foregoing detailed description of parts, but for completeness of disclosure, the manner of usage will be briefly described.

The first step in the layout procedure is to align the reference plate 11 containing the circular manufacturing hole 13, the position and size of which is to be transferred, accurately over the work plate 12 and securely clamp the plates in position.

Then, the punch 10 is located on the reference plate 11 as is best seen in Figs. 1 and 2. First, the conical body end 15 is interfitted with the manufacturing hole 13. It is seen that in this initial step, the sleeve 20 is usually held away from the reference plate 11 in its retracted position under the loading of spring 27 and that the punch rod 16 is held in its fully retracted position within the body 14 under the loading of spring 26. Because of the conical configuration of body end 15, the tool is adaptable for any size manufacturing hole 13.

Normally the reference plate 11 is of suitable thickness so that the conical body end 15 can be inserted into any size manufacturing hole 13 within the range determined by the diameter of cylindrical body 14 at the base of the conical formation. However, if the reference plate 11 is relatively thin so that the body end 15 would project through the manufacturing hole 13 and engage the work plate 12 without seating on the peripheral margin of the reference plate defining the hole 13, certain additional steps must be taken in the layout assembly of the plates 11 and 12. For example, the reference plate 11 must be spaced farther from the work plate 12 to enable the conical body end 15 to engage the reference plate 11 at the margin defining the hole 13. To enable this result, suitable spacers are inserted between the reference plate 11 and work plate 12 when such plates are clamped in assembly.

For purposes of description and disclosure however, it will be assumed that the reference plate 11 is of the thickness illustrated in Fig. 2 and that the manufacturing hole 13 is of the diameter illustrated. As is seen in the drawing, the conical body end 15 engages the reference plate 11 at the margin of the manufacturing hole 13.

After the conical body end 15 is inserted into the manufacturing hole 13, the sleeve 20, gripped by the operator, is moved downwardly on the body 14 under the resilient loading of spring 27 toward the conical body end and toward the reference plate 11. In slidably moving relative to body 14, the sleeve 20 overlaps the conical body end 15 and the abutment 21 engages the reference plate 11. Because the abutment 21 is arranged at a right angle to the longitudinal axis of body 14 about which the conical formation 15 is symmetrical, the abutment 21 causes the conical body end 15 to be centered or aligned accurately in the manufacturing hole 13. In other words, the longitudinal axis of body 14 along which the punch rod is slidably operable is accurately located at a right angle to the surface of the reference plate 11. Automatically because of the engagement of the conical body end 15 with the margin of the manufacturing hole 13, the longitudinal axis of the body 14 and hence the punch rod 16 define the exact center of the hole 13.

When the tool has been accurately centered by use of the guide sleeve 20 in the manner previously described, the operator strikes or taps the upper end 18 of punch rod 16. Upon striking, the rod 16 projects outwardly through the center of the conical body end 15 along the longitudinal axis of body 14, as is best illustrated in Fig. 4. The point 17 of the rod 16 engages the work plate 12 and marks the exact center of the manufacturing hole 13 onto the work plate 12.

The spring 26 urges the punch rod 16 back into its retracted position within the body 14 after the marking action. When the tool or punch 10 is lifted out of engagement with the reference plate 11, the spring 27 urges the sleeve 20 back to its normal retracted position on body 15 in which the abutment 21 is located ahead of the conical body end 15. The punch 10 is now conditioned for subsequent operation in the manner previously described to transfer the center of other manufacturing holes.

It is seen that the single punch 10 is capable of transferring the center of any manufacturing hole within the range determined by the base diameter of the conical body end 15.

Although the invention has been described by making detailed reference to a single preferred embodiment, such detail is to be understood in an instructive, rather than in any restrictive sense, many variants being possible within the scope of the claims hereunto appended.

I claim as my invention:

1. A punch comprising a body having a conical end, a rod slidably mounted in said body along a longitudinal axis through the center of said conical end, a sleeve slidably mounted on said body, a key fixed to and carried by said sleeve and extending into said body, the rod slidably extending through said key to hold the key in assembly with the rod yet enable relative sliding movement incident to reciprocation of either the rod or the sleeve, a spring on one side of said key engaging said key and said rod tending to hold the rod retracted in said conical end, the sleeve including an abutment arranged at a right angle to the said longitudinal axis and adapted to engage the reference work piece when said sleeve is moved toward the conical end, and another spring on the opposite side of said key engaging said key and said body tending to hold the sleeve away from the conical end.

2. A punch comprising a body having a conical end, a rod slidably mounted in said body along a longitudinal axis through the center of said conical end, a sleeve slidably mounted on said body, the body being provided with a laterally opening longitudinal slot, a key carried by the sleeve and extending through said slot, the rod slidably extending through said key to hold the key in assembly with the rod yet enable relative sliding movement incident to reciprocation of either the rod or the sleeve, the key and slot guiding the sleeve in its longitudinal movement toward and away from the conical body end and preventing relative rotation of said sleeve and body, a spring on one side of said key engaging the key and said rod tending to hold the rod retracted in said conical end, the sleeve including an abutment arranged at a right angle to the said longitudinal axis and adapted to engage the reference work piece when said sleeve is moved toward the conical end, and another spring on the opposite side of said key engaging the key and said body tending to hold the sleeve away from the conical end.

3. A hole center transfer punch comprising an elongate body having a conical end, a punch rod slidably mounted in said body along a longitudinal axis through the center of said conical end, a sleeve slidably mounted on said body, said sleeve having one end arranged at a right angle to said longitudinal axis, said body being provided with a transverse slot therethrough extending longitudinally of the body, a key carried by the sleeve and extending transversely of the body through said slot, said key and slot guiding the sleeve in its relative movement along said body and preventing relative rotation of said sleeve and body, the punch rod slidably extending through said key, the key providing a bearing for said rod, a first spring in the transverse slot of said body at one side of said key engaging the rod tending to urge the rod in a retracted position with the conical end, said rod having one end portion extending through the body adapted to be struck so as to extend the other end portion through said conical end, and a second spring in the transverse slot on the other side of said key engaging the body tending to hold the sleeve in a retracted position ahead of said conical body end, said sleeve being movable to a position in which the sleeve end overlaps the conical body end, the abutment being adapted to engage the reference work piece and center the conical body end in a manufacturing hole.

References Cited in the file of this patent

UNITED STATES PATENTS

| | | |
|---|---|---|
| 790,963 | Jackson | May 30, 1905 |
| 1,233,458 | Fisk | July 17, 1917 |
| 2,595,347 | Flemming | May 6, 1952 |